UNITED STATES PATENT OFFICE.

RICHARD GUENTHER, OF OSHKOSH, WISCONSIN.

IMPROVEMENT IN WASHING-POWDERS.

Specification forming part of Letters Patent No. 134,139, dated December 24, 1872.

*To all whom it may concern:*

Be it known that I, RICHARD GUENTHER, in the city of Oshkosh, county of Winnebago, State of Wisconsin, have invented a certain preparation called "American Washing-Powder," to be used instead of soaps for ordinary washing purposes, of which the following is a specification:

The nature of this invention consists in dissolving anhydrous powdered silicate of soda or potassa, called soluble glass, by boiling in water, filtering, inspissating, pulverizing, and drying the same.

The preparation obtained consists of silicate of soda or potassa, with about eighty per cent. of water chemically bound; is therefore an hydrous silicate of soda or potassa. This property renders it readily soluble in cold or warm water, while the silicate of soda or potassa, in dry form, found in commerce, is anhydrous and soluble only by continued boiling in water.

To prepare the same, take soluble glass in crystals—that is, anhydrous silicate of soda or potassa—pulverize it, and dissolve in about twelve parts of water by continued boiling in an iron vessel. Then filter the obtained liquid and inspissate by a gentle heat, till, on cooling, it becomes fragile. Pulverize then, and dry the powder in a dry room until it is perfectly dry. This powder is "hydrous soluble glass." It can thus be kept for years; does not decompose by age, (as the solution does in time.) It is readily soluble in cold or warm water.

Dissolved in water this powder answers all the purposes of ordinary soaps; is more economical than soap or any other washing medium. It is not detrimental or injurious to the fiber of the cloth. It is a disinfectant. It does not produce any foam, and is therefore preferable in some cases, especially with washing-machines, where the abundant production of foam by using soaps is a great objection. It operates quicker and more efficiently than soaps. It does away with the hard rubbing of the cloth on wash-boards when using soaps. This rubbing destroys the fiber of the cloth more or less. It saves more than half the labor than by any other mode of washing. It operates in hard water better than soap.

In patent 132,154, issued to me October 15, 1872, I have discovered a washing compound containing the same principal ingredients as my late invention, except that they are in a different state. My present invention is an improvement on that, as it comes cheaper; is in a form to be more cheaply transported; does not decompose by age, as the "American Washing Compound" will, in time. It is more convenient to be handled. It is preferable to the "compound" because the latter freezes in cold weather.

Having described my invention, what I claim as new, and for which I desire to secure Letters Patent, is—

As an article of manufacture, a washing-powder, consisting of hydrous silicate of soda or potassa, called soluble glass, in dry, fine powder, for the purpose specified.

RICHARD GUENTHER.

Witnesses:
CHRIS. SCHREIBER,
HUGO KINMUSTAEDT.